United States Patent [19]

Berisch et al.

[11] 4,335,922
[45] Jun. 22, 1982

[54] PRESSURE CONTROL UNIT

[75] Inventors: Volker Berisch, Hattersheim; Karl Keiner, Schöffengrund, both of Fed. Rep. of Germany

[73] Assignee: ITT Industries, Inc., New York, N.Y.

[21] Appl. No.: 163,377

[22] Filed: Jun. 26, 1980

[30] Foreign Application Priority Data

Jul. 11, 1979 [DE] Fed. Rep. of Germany ....... 2927902

[51] Int. Cl.³ .............................................. A60T 11/34
[52] U.S. Cl. .................................. 303/6 C; 303/84 A
[58] Field of Search ............. 188/349; 303/6 C, 22 R, 303/24 F, 84 A

[56] References Cited

U.S. PATENT DOCUMENTS 3,467,440 9/1969 Strien .................................. 303/6 C
3,769,997 11/1973 Hardwick et al. ............. 303/6 C X

FOREIGN PATENT DOCUMENTS 2731201 1/1979 Fed. Rep. of Germany ...... 303/6 C

Primary Examiner—Duane A. Reger
Attorney, Agent, or Firm—John T. O'Halloran; Alfred C. Hill

[57] ABSTRACT

A pressure reducing control unit for brake system connected in the pressure connection between a master cylinder and a slave cylinder is known. The known arrangement is, however, of great overall length and is not safe against failure as well as being expensive with regard to production. According to the present invention the differential piston is constructed as a hollow cylinder having one end thereof slidably sealed in a housing bore and its other end slidable sealed on a plug fastened to the housing and projecting into the bore of the hollow cylinder. The pressure medium inlet is arranged in the plug. The differential piston on the end remote from the plug has a radial shoulder directed inwardly acting as a valve seat and separating an inlet chamber from an outlet chamber. The valve closing member is disposed at the end of the plug adjacent the shoulder.

37 Claims, 3 Drawing Figures

ID="4,335,922"

PRESSURE CONTROL UNIT

BACKGROUND OF THE INVENTION

The present invention relates to a pressure reducing control unit, in particular for motor vehicle brake systems, the pressure control unit lying in the pressure medium connection between a master cylinder and at least one slave cylinder and comprising at least one differential piston having a pressure medium passage disposed in a housing, which is acted upon by the force of a control spring, and a valve which is operable dependent on the displacement of the differential piston.

Such a pressure control unit is disclosed in the U.S. Pat. No. 3,727,989 issued Apr. 17, 1973. However, the known pressure control unit is characterized by a long constructional length and a heavy weight. Further, the machining and assembly of the pressure control unit are very extensive since the housing bore which is stepped several times has to be made from two sides and since the assembly of the individual part is also effected from two sides. This also implies the need of inserting an additional closure member with seals.

Further, the known pressure control unit has some functional disadvantages due to the specific design of the valve.

SUMMARY OF THE INVENTION

It is an object of the present invention to provide a pressure control unit of the type referred to above, which enables inexpensive manufacture and easy assembly and which features a small constructional length and a low weight.

A feature of the present invention is the provision of a pressure control unit for motor vehicle brake systems disposed in a pressure medium connection between a master cylinder and at least one slave cylinder of a first hydraulic brake circuit comprising a housing having a longitudinal axis; a differential piston disposed in a bore of the housing having a pressure medium passage between an inlet chamber and an outlet chamber, the piston being acted upon by the force of at least one control spring, the piston being a hollow cylinder coaxial of the axis having one end thereof slidably sealed in the bore and the other end thereof slidably sealed on a plug disposed in the bore coaxial of the axis and secured to the housing, the piston including adjacent the one end thereof a radial inwardly projecting collar separating the inlet chamber and the outlet chamber; and a valve having a valve closure member disposed at the end of the plug adjacent the collar operable dependent on the displacement of the piston.

The fundamental advantages of the inventive pressure control unit in particular are
(a) the pressure control unit has a short constructional length and a low weight;
(b) the pressure control unit comprises just a few components which are easily machined and assembled, thus, the costs of manufacture are kept to an extremely low level; and
(c) the pressure control unit has an extreme operational reliability.

Thanks to at least one embodiment of the valve an easier design of the valve closure member is achieved. Further, the control unit is constructed so as to ensure the adjustability of the force of the control spring, since the closing distance of the valve is determined by the length of the tappet. In order to keep the number of individual components as small as possible, it is of advantage for the plug to be part of a closure member of the housing.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
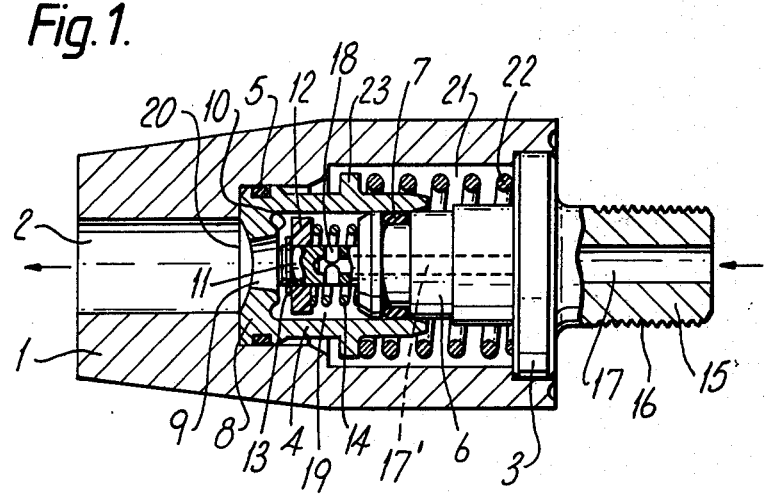
FIG. 1 is a longitudinal cross sectional view of one embodiment of a pressure control unit in accordance with the principles of the present invention.

In FIG. 1, a housing 1 is provided with a bore which is stepped several times, the smaller diameter end of the bore being constructed as pressure medium connection 2 for a slave cylinder and the larger diameter end of the bore having a closure member 3. Closure member 3 may be secured to housing 1, e.g. by means of caulking. The bore of housing 1 accommodates a differential piston 4 which essentially has the construction of a U-shaped hollow cylinder. The end of differential piston 4 which is adjacent to pressure medium connection 2 is guided in the bore of housing 1 and sealed thereto by means of a seal 5. The other end of differential piston 4 is guided on a plug 6 constructed to form part of closure member 3 and extending into the bore of housing 1. Plug 6 is sealed to piston 4 by means of a seal 7.

On the end of piston 4 adjacent to the pressure medium connection 2 there is provided a radially inwardly pointing collar 8 which contains a pressure medium passage 9. On the side of collar 8 facing plug 6, an annular valve seat 10 is provided. Plug 6 has an extension 11 on its free end. Extension 11 has disposed thereon in a slidable sealed manner an annular valve closure member 12. At the free end of extension 11 a ring 13 is fastened which serves as stop for valve closure member 12 and against which valve closure member 12 is biased by means of a spring 14 supported at the adjacent end of plug 6.

Closure member 3 has a second plug 15 which extends axially outward and which is provided with an external thread 16. A pressure medium channel 17, 17' extends through closure member 3 and its two plugs 6 and 15, passing through a cross hole 18 in extension 11 and ending in an inlet chamber 19 of the pressure control unit. Due to the specific construction of closure member 3 with second plug 15 and its thread 16, the pressure control unit is particularly suitable as screw-in cartridge, e.g. for being screwed into the pressure medium connection of a master cylinder.

The end of differential piston 4 which faces pressure medium connection 2 defines a pressure outlet chamber 20. Between housing 1 and plug 6 and between housing 1 and a portion of differential piston 4, respectively, an annular chamber 21 is formed which accomodates a control spring 22 disposed between closure member 3 and a radially outwardly projecting collar 23 of differential piston 4.

The mode of operation of the pressure control unit of FIG. 1 is as follows.

In the rest position of the arrangement, the two moving parts, i.e. differential piston 4 and valve closure member 12, will be in the illustrated positions. If in the inlet port a pressure is built up, pressure medium will flow through pressure medium channel 17, 17', cross hole 18, and pressure medium passage 9 to pressure medium connection 2 from where it will proceed to the slave cylinder.

When a certain pressure level is achieved due to the pressurized surfaces of differential piston 4 which are varying in size, a force difference will become effective which will displace differential piston 4 against the force of control spring 22 toward closure member 3. This movement of differential piston 4 will cause valve seat 10 to abut valve closure member 12 and to thus close pressure medium passage 9.

A further increase in pressure in the master cylinder will result in a reduced pressure increase in the slave cylinder in correspondence with the surface ratio of the end of differential piston 4 defining inlet chamber 19 relative to the surface of differential piston 4 defining outlet chamber 20.

If in the inlet port the pressure is reduced to the point where the inlet pressure will be lower than the outlet pressure, than valve closure member 12 will move against the force of spring 14 toward closure member 3 due to the force difference resulting from the different pressures and will thus lift off valve seat 10 and as a result pressure medium passage 9 will be open again. Thus, the pressure at the slave cylinder and the master cylinder will again be equal.

Figure 2:
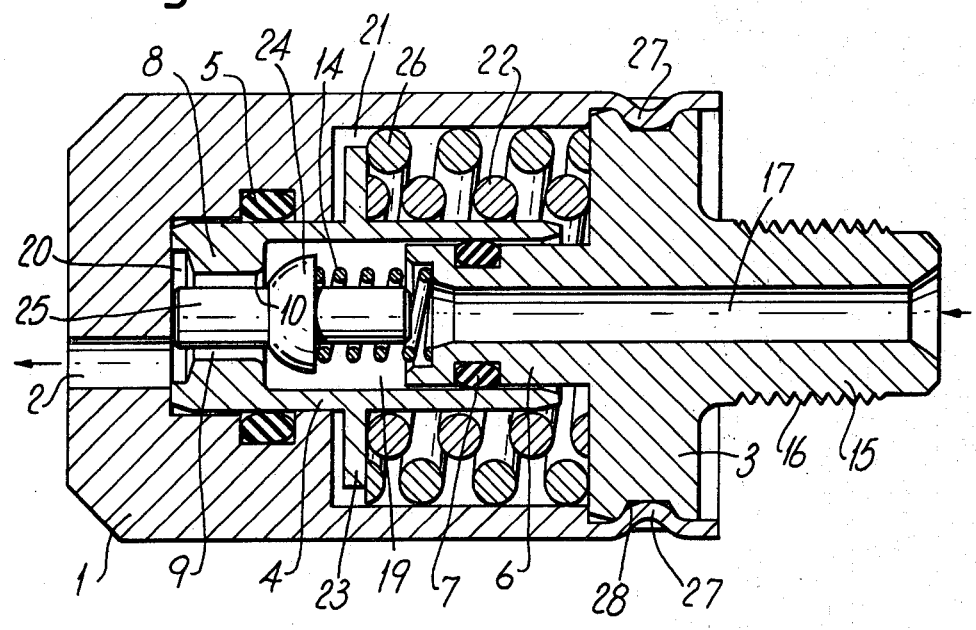
FIG. 2 is a longitudinal cross sectional view of another embodiment of a pressure control unit in accordance with the principles of the present invention having an adjustable control force.

In FIG. 2, a pressure control unit is illustrated whose essential components correspond to those of FIG. 1. In order to avoid repetitions, the following description will only deal with the differences with respect of the subject matter of FIG. 1. The same parts will, thus, have the same reference numerals.

In the embodiment of FIG. 2 a cone valve 24 is provided as valve closure member 12. Cone valve 24 supports itself at the end wall of housing 1 by means of a tappet 25. A spring 14 supports cone valve 24 at plug 6. In order to level up the change-over point of the pressure control valve a second control spring 26 is provided in addition to control spring 22.

Housing 1 is thinwalled in the area which accomodates closure member 3. By means of projections 27, housing 1 engages a radial recess 28 of closure member 3. This arrangement enables the control force to be adjusted, the assembly being easy. To this end, closure member 3 is inserted into the bore of housing 1 with the originally plane housing wall and is displaced in the direction of control springs 22 and 26, thereby loading these springs. As soon as these springs have been preloaded with the desired force, the thinwalled portion of housing 1, in the area of radial recess 28, will be pressed into recess 28, thus, forming projections 27.

The adjustability of the force is possible because of the length of tappet 25 determining the valve closing distance. Thus, the valve closing distance is independent of the position of closure member 3 relative to housing 1. Due to the small closing distance tolerances, this embodiment is particularly suitable for twin control units.

The mode of operation of the pressure control unit illustrated in FIG. 2 is as already described with reference to FIG. 1.

Figure 3:
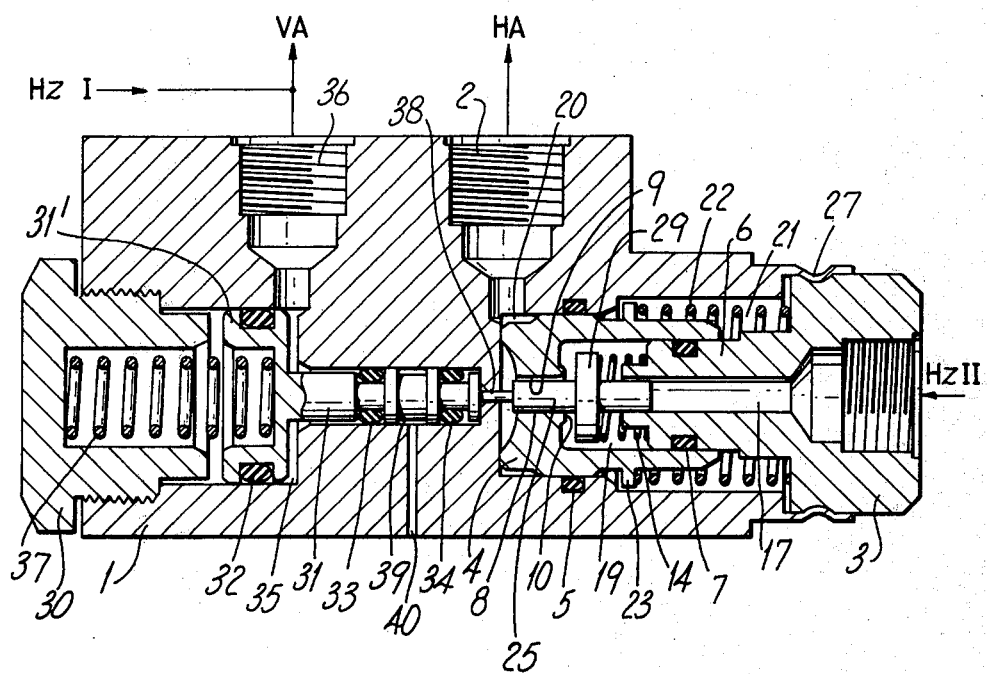
FIG. 3 is a longitudinal cross sectional view of a pressure control unit for a vehicular brake system coupled to a first brake circuit associated with the front wheels and to a second brake circuit associated with the rear wheels.

In FIG. 3, a pressure control unit is illustrated for a two-circuit vehicular brake system, the first brake circuit being associated with the front wheels and the second brake circuit being associated with the rear wheels. In this embodiment, the right-hand portion of the pressure control unit resembles the arrangements in FIGS. 1 and 2 very much. For the sake of avoiding repetitions here, only the differences with respect to the pressure control units described above will be pointed out. The same parts will have the same reference numerals.

A poppet valve 29 is provided as valve closure member 12. Poppet valve 29 has a tappet 25 projecting through pressure medium passage 9 into outlet chamber 20 where it is supported at a stop means. A master cylinder outlet Hz II is connected to inlet channel 17 and the wheel cylinders of the rear wheel brakes HA are connected to pressure medium connection 2.

In the left-hand portion of housing 1, a second bore is provided whose end has a thread into which a screw plug 30 is screwed. The stepped bore accomodates a stepped piston 31, 31' which is sealed to housing 1 by means of seals 32, 33, and 34. The larger piston portion 31' defines a pressure chamber 35 by means of its end which is facing the smaller piston portion 31. A pressure medium connection 36 connected with a brake circuit VA acting on the front wheels is connected to pressure chamber 35. Between the larger piston portion 31' and screw plug 30, a helical compression spring 37 is inserted which preloads piston 31, 31' in the direction of pressure chamber 35. At the free end of the smaller piston portion 31, a pin 38 is arranged which projects through an opening in housing 1 into pressure outlet chamber 20 and bears against tappet 25 of poppet valve 29. Between seals 33 and 34, piston portion 31 has an annular chamber 39 which communicates with the atmosphere via an opening 40 in housing 1.

Provided the brake circuit acting on front wheel brakes VA is intact, piston portion 31 will be displaced against the force of helical compression spring 37 by a pressure built up at the master cylinder inlet Hz I resulting in pin 38 being drawn out of outlet chamber 20. Tappet 25 of poppet valve 29 now will abut the wall of housing 1. Poppet valve 29 will be in the so-called ready position, i.e. upon a corresponding displacement of differential piston 4, the valve will be closed.

Upon failure of brake circuit Hz I acting on the front wheel brakes VA, the force of helical compression spring 37 will keep piston 31, 31' in its rest position, pin 38 keeping poppet valve 29 in a position which will prevent the valve from closing even upon a maximum displacement of differential piston 4. This arrangement serves the purpose of ensuring that, upon failure of the front axle brake circuit VA, the rear axle brake circuit HA will be supplied with a braking pressure which will not be reduced.

While we have described above the principles of our invention in connection with specific apparatus it is to be clearly understood that this description is made only by way of example and not as a limitation to the scope of our invention as set forth in the objects thereof and in the accompanying claims.

We claim:

1. A pressure control unit for motor vehicle brake systems disposed in a pressure medium connection between a master cylinder and at least one slave cylinder of a first hydraulic brake circuit comprising:
- a housing having a longitudinal axis;
- a differential piston disposed in a bore of said housing having a pressure medium passage between an inlet chamber and an outlet chamber, said piston being acted upon by the force of at least one control spring, said piston being a hollow cylinder coaxial of said axis having one end thereof slidably sealed in said bore and the other end thereof slidably sealed to the outer surface of a plug disposed in said bore coaxial of said axis and immovably secured to said housing, said piston including adjacent said one end thereof a radial inwardly projecting collar separating said inlet chamber and said outlet chamber; and
- a valve having a valve closure member disposed at the end of said plug adjacent said collar operable dependent on the displacement of said piston.

2. A control unit according to claim 1, wherein said collar includes an axial opening as said pressure medium passage and said collar is a valve seat cooperating with said valve closure member.

3. A control unit according to claims 1 or 2, wherein said valve closure member is disposed on an axial extension of said plug in a slidably sealed manner and is biased by a second spring against a stop ring fastened at the end of said extension adjacent said collar.

4. A control unit according to claim 3, wherein said plug is an integral part of a closure member for said housing bore.

5. A control unit according to claim 4, wherein said control spring surrounds at least a part of said piston coaxially.

6. A control unit according to claim 5, wherein said piston has a radial outwardly projecting shoulder, and one end of said control spring abuts said shoulder and the other end of said control spring abuts said plug.

7. A control unit according to claim 3, wherein said control spring surrounds at least a part of said piston coaxially.

8. A control unit according to claim 7, wherein said piston has a radial outwardly projecting shoulder, and one end of said control spring abuts said shoulder and the other end of said control spring abuts said plug.

9. A control unit according to claims 1 or 2, wherein said valve closure member is a cone valve disposed between said collar and said plug, said cone valve being biased by a second spring toward said collar and having a tappet thereon remote from said plug bearing against a stop fixed in said housing.

10. A control unit according to claim 9, wherein said cone valve is maintained in its open position by a device responsive to pressure failure in a second hydraulic brake circuit.

11. A control unit according to claim 10, wherein said plug is an integral part of a closure member for said housing bore.

12. A control unit according to claim 11, wherein said control spring surrounds at least a part of said piston coaxially.

13. A control unit according to claim 12, wherein said piston has a radial outwardly projecting shoulder, and one end of said control spring abuts said shoulder and the other end of said control spring abuts said plug.

14. A control unit according to claim 10, wherein said control spring surrounds at least a part of said piston coaxially.

15. A control unit according to claim 14, wherein said piston has a radial outwardly projecting shoulder, and one end of said control spring abuts said shoulder and the other end of said control spring abuts said plug.

16. A control unit according to claim 9, wherein said plug is an integral part of a closure member for said housing bore.

17. A control unit according to claim 16, wherein said control spring surrounds at least a part of said piston coaxially.

18. A control unit according to claim 17, wherein said piston has a radial outwardly projecting shoulder, and one end of said control spring abuts said shoulder and the other end of said control spring abuts said plug.

19. A control unit according to claim 9, wherein said control spring surrounds at least a part of said piston coaxially.

20. A control unit according to claim 19, wherein said piston has a radial outwardly projecting shoulder, and one end of said control spring abuts said shoulder and the other end of said control spring abuts said plug.

21. A control unit according to claims 1 or 2, wherein said valve closure member is a poppet valve disposed between said collar and said plug, said poppet valve being biased by a second spring toward said collar and having a tappet thereon remote from said plug bearing against a stop fixed in said housing.

22. A control unit according to claim 21, wherein said poppet valve is maintained in its open position by a device responsive to pressure failure in a second hydraulic brake circuit.

23. A control unit according to claim 22, wherein said plug is an integral part of a closure member for said housing bore.

24. A control unit according to claim 23, wherein said control spring surrounds at least a part of said piston coaxially.

25. A control unit according to claim 24, wherein said piston has a radial outwardly projecting shoulder, and one end of said control spring abuts said shoulder and the other end of said control spring abuts said plug.

26. A control unit according to claim 22, wherein said control spring surrounds at least a part of said piston coaxially.

27. A control unit according to claim 26, wherein said piston has a radial outwardly projecting shoulder, and one end of said control spring abuts said shoulder and the other end of said control spring abuts said plug.

28. A control unit according to claim 21, wherein said plug is an integral part of a closure member for said housing bore.

29. A control unit according to claim 28, wherein said control spring surrounds at least a part of said piston coaxially.

30. A control unit according to claim 29, wherein said piston has a radial outwardly projecting shoulder, and one end of said control spring abuts said shoulder and the other end of said control spring abuts said plug.

31. A control unit according to claim 21, wherein said control spring surrounds at least a part of said piston coaxially.

32. A control unit according to claim 31, wherein said piston has a radial outwardly projecting shoulder, and one end of said control spring abuts said shoulder and the other end of said control spring abuts said plug.

33. A control unit according to claims 1 or 2, wherein said plug is an integral part of a closure member for said housing bore.

34. A control unit according to claim 33, wherein said control spring surrounds at least a part of said piston coaxially.

35. A control unit according to claim 34, wherein said piston has a radial outwardly projecting shoulder, and one end of said control spring abuts said shoulder and the other end of said control spring abuts said plug.

36. A control unit according to claims 1 or 2, wherein said control spring surrounds at least a part of said piston coaxially.

37. A control unit according to claim 36, wherein said piston has a radial outwardly projecting shoulder, and one end of said control spring abuts said shoulder and the other end of said control spring abuts said plug.

* * * * *